May 21, 1968     R. F. CARELLA     3,383,945
HANDLE ASSEMBLY
Filed March 7, 1966     2 Sheets-Sheet 1
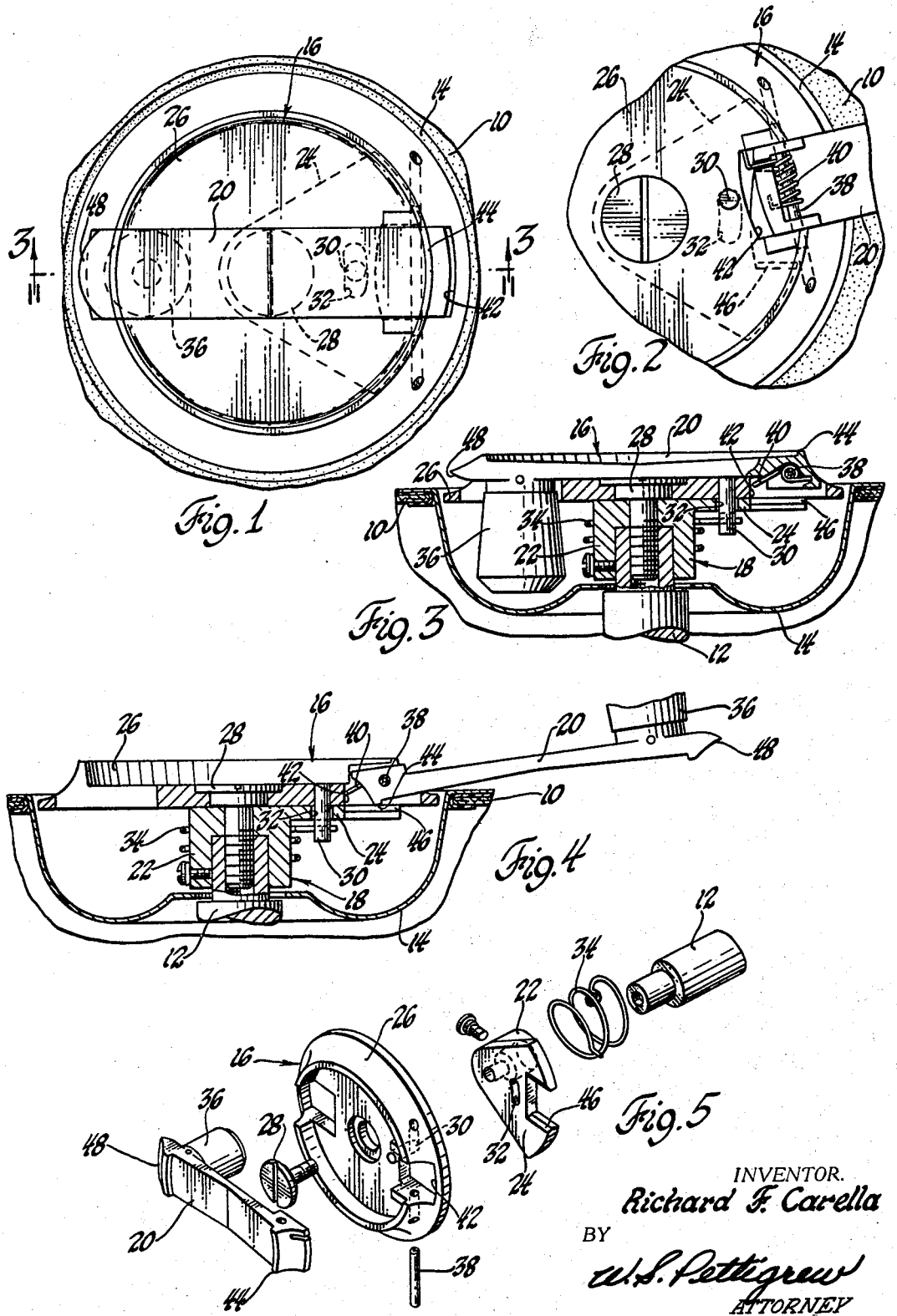
INVENTOR.
Richard F. Carella
BY
W. S. Pettigrew
ATTORNEY

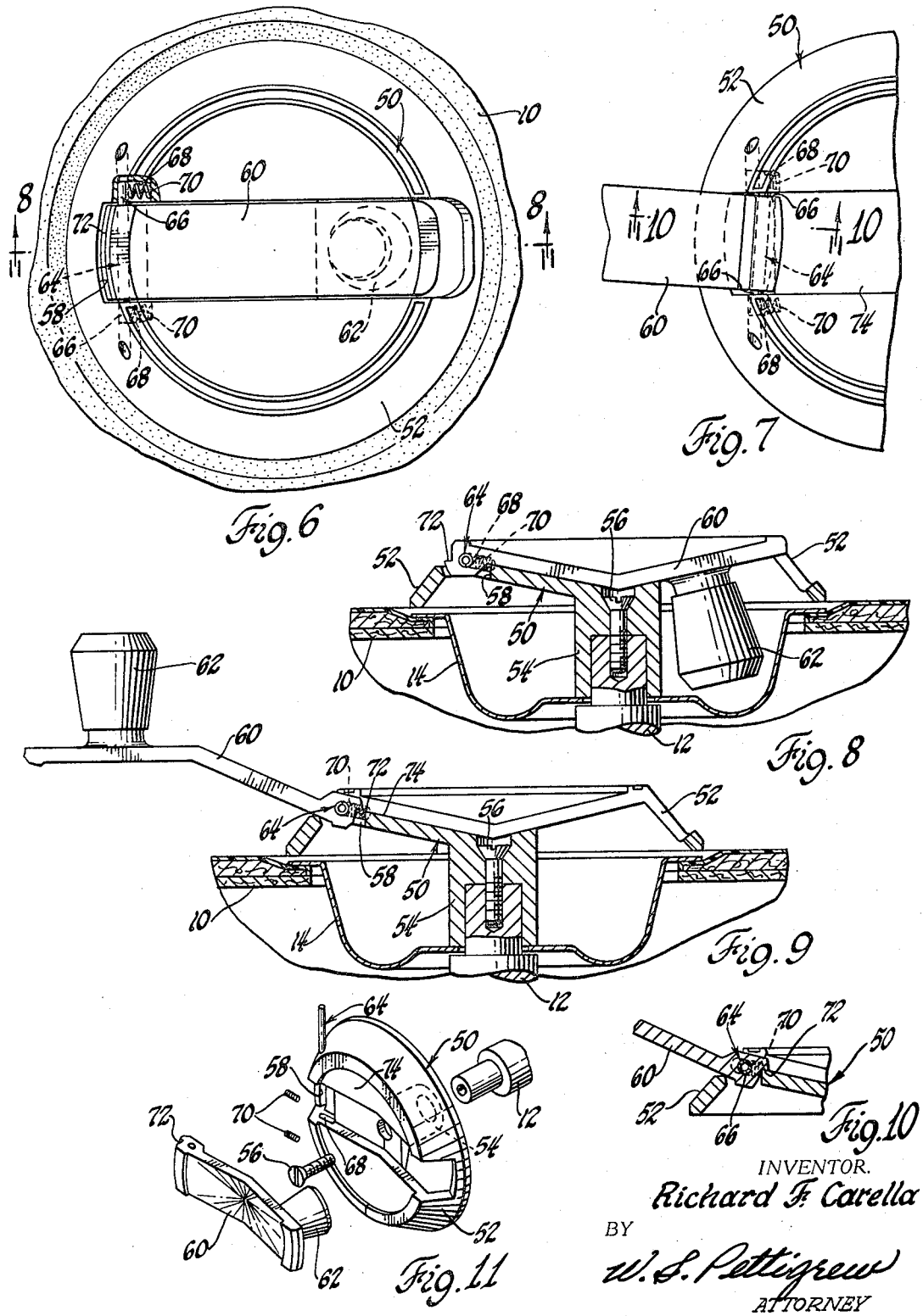

United States Patent Office 3,383,945
Patented May 21, 1968

3,383,945
HANDLE ASSEMBLY
Richard F. Carella, Mount Clemens, Mich., assignor to General Motors Corporation, Detroit, Mich., a corporation of Delaware
Filed Mar. 7, 1966, Ser. No. 532,229
5 Claims. (Cl. 74—547)

ABSTRACT OF THE DISCLOSURE

A retractable crank handle assembly for connection to the spindle of a vehicle body window regulator mechanism or the like includes a hub assembly directly attached to the spindle and a cranking member mounted on the hub assembly and movable between an inoperative position retracted to the hub assembly and an operative position extending therefrom for manipulation and cranking movement on the spindle. The cranking member in cranking position is permitted limited bodily movement relative to the hub assembly under initial cranking effort from a resiliently centered nondetented position to a detented position wherein detent shoulders on the cranking member and the hub assembly engage to prevent movement of the cranking member back to its retracted position while cranking motion is in progress. In a first embodiment, the cranking member is mounted on a decorative outer member of the hub assembly which is permitted limited cranking rotation relative to an inner member fixed on the spindle, the detent shoulders being provided on the cranking member and the inner hub member. In a second embodiment, the limited relative cranking movement for detenting is provided directly in the connection between the cranking member and a single hub member on the spindle.

---

In most prior known handle constructions of the type including a crank member movable from a retracted to an extended position relative to a hub whereby to become operative for rotation of the hub and an attached drive shaft, there has been the problem of the tendency of the crank member to seek its retracted position under the cranking force applied thereto during portions of the cranking movement. While certain prior handle constructions have incorporated means for maintaining the crank member in its extended position while being operated, these have been subject to excessive wear in use or have required inconvenient additional manipulation preparatory to the actual cranking motion.

One object of this invention is to provide an improved retractable crank handle assembly answering to the above difficulties.

Another object of this invention is to provide a handle assembly including a crank member movable between a retracted position and an extended cranking position, and crank member detenting means operative in direct response to the mere initial cranking effort applied to the crank member.

Another object of this invention is to provide a handle assembly according to the foregoing and further including means operative to release the detent means and return the crank member to retracted position immediately as the cranking effort is released from the crank member.

Other more specific objects, features and advantages of the invention will be readily apparent from the following specification and the drawings wherein:

FIGURE 1 is a fragmentary view showing a handle assembly according to the invention mounted on a body wall in association with a mechanism to be operated and showing the crank member thereof in retracted position;

FIGURE 2 is a fragmentary view similar to FIGURE 1 showing the crank member in an extended and detented position;

FIGURE 3 is a sectional view taken generally along the plane indicated by lines 3—3 of FIGURE 1;

FIGURE 4 is a view similar to FIGURE 3 and showing the crank member in the extended and detented position of FIGURE 2;

FIGURE 5 is an exploded perspective view;

FIGURE 6 is a fragmentary view similar to FIGURE 1 showing a second embodiment of a handle assembly according to the invention and showing the crank member in retracted position;

FIGURE 7 is a fragmentary view similar to FIGURE 6 showing the crank member in an extended and detented position;

FIGURE 8 is a sectional view taken generally along the plane indicated by lines 8—8 of FIGURE 6;

FIGURE 9 is a view similar to FIGURE 8 but showing the crank member in an extended but nondetented position;

FIGURE 10 is a sectional view taken generally along the plane indicated by lines 10—10 of FIGURE 7; and FIGURE 11 is an exploded perspective view.

Referring now to the embodiment of FIGURES 1 through 5 and particularly to FIGURE 1, a handle assembly according to the invention is shown mounted on a body wall indicated at 10 for association with a mechanism to be operated, not shown, having a drive shaft or spindle 12, shown in FIGURE 3. An escutcheon 14 of generally dish-like configuration is centrally apertured and mounted on wall 10 over spindle 12. The handle assembly, designated as 16, generally includes a hub means or assembly 18 and a crank member 20 adapted to be mounted on the hub assembly in a manner presently to be described for movement between a retracted position as shown in FIGURE 3 and an extended operative position, FIGURE 4. Hub assembly 18 is comprised of a spindle engaging member 22 centrally bored and counterbored to receive the end of spindle 12 and provided with a flat bearing portion 24, and a decorative disc 26 overlying member 22 and rotatably secured thereto by a shouldered screw 28 threadably engaged within the end of spindle 12. A locator pin 30 extends downwardly of the disc 26 to be received within an arcuate slot 32 in bearing portion 24, and a coil torsion spring 34 surrounds member 22 and is anchored at one end thereto by an antirotation spindle set screw and engaged at its other end within a slot in the projecting end of pin 30. Spring 34 seeks a relaxed position locating disc 26 and hub 22 relatively of each other in a neutral position shown in FIGURE 1, and resists relative rotation in either direction from such position.

Crank member 20 includes on one end thereof a knob 36 receivable in retracted position within an aperture of disc 26. At its other end, the crank member rotatably receives through a bore thereof a pin 38 also received through aligned bores in the disc 26. Suitable plug or other means, not shown, are provided to prevent pin 38 from falling out of the aligned bores in normal use. A coil torsion spring 40 surrounds pin 38 and bears at one end thereof on an adjacent portion of disc 26 and at its other end on an undersurface of crank member 20 to bias the crank member to retracted position. As best noted in FIGURE 5, disc 26 immediately underneath the pinned end of crank member 20 is provided with an opening 42 suitable for oscillation of the pinned end of the crank member therein.

As best noted in FIGURE 3, the decorative upper surface of crank member 20 is provided adjacent its pinned end with a first detent shoulder 44, also indicated in FIGURE 5. Bearing portion 24 of the member 22 includes a cutout complementary in shape to the opening 42 in disc 26 immediately thereabove, and opposite edges of the portion defining this cutout are provided with cam ramps 46.

In operation, and assuming that the crank portion 20 is in retracted position, the operator inserts his finger under an end portion 48 of crank member 20 and rotates it to the extended position of FIGURE 4 whereby to apply a cranking effort to the knob 36 in either rotative direction, the oscillation of detent shoulder 44 being accommodated by the cutout in bearing portion 24. By the limited lost motion available between the disc 26 and member 22 as defined by the length of slot 32, initial cranking effort, say counterclockwise as viewed in FIGURE 2, will rotatively displace crank member 20 and disc 26 relative to member 22 and spindle 12 until pin 30 bottoms in slot 32. Such displacement carries the detent shoulder 44 out of the neutral position within the cutout of bearing portion 24 to a position wherein the detent shoulder overlies and flushly engages the adjacent upper surface of the bearing portion, which engagement prevents rotation of crank member 20 about pin 38 toward retracted position under the force of spring 34. If the crank member was not sufficiently rotated to permit this overlying engagement, the cam ramp 46 will cam the crank member to the proper position permitting the engagement. This state of the parts is maintained throughout application of the minimum crank force necessary to overcome torsion spring 34, and cranking of spindle 12 may thus proceed without any tendency of the crank member to retract as during a "pull" portion of the manipulation. The cranking effort on the crank member and disc 26 is of course transferred through the bottomed-out pin 32 to member 22 and spindle 12. Once cranking effort is released, spring 34 returns crank member 20 and disc 26 to the neutral relation of FIGURE 1, and with detent shoulder 44 being removed from the bearing portion 24, the crank member is free within the cutout in bearing portion 24 to return to retracted position under the bias of torsion spring 40.

Referring now to FIGURES 6 through 11 inclusive, there is shown a second embodiment of a handle assembly according to the invention, with like numerals referring to like parts. In this simpler embodiment, the hub means is comprised of but a single member 50 having a decorative disc portion 52 and an integral spindle boss 54 which is again secured to spindle 12 by a screw 56. Again, the disc portion 52 is provided with a knob receiving opening at one side thereof and a further aperture 58 at the opposite side. The crank member 60 is similar to that of the previous embodiment and again includes a knob 62 at one end thereof and at its other end is bored to receive a mounting pin or retention stud means 64. Rather than being securely fixed within the aligned bores of the disc portion 52, the projecting ends or stud portions 66 of pin 64 are wholly contained loosely within a pair of recesses 68 opening to the aperture 58. A pair of small compression springs 70 within these recesses bear against the stud portions 66 to locate crank member 60 in a neutral relation shown in FIGURES 6 and 8.

In operation, and assuming the crank member 60 to have been moved from retracted position to the extended operative position of FIGURE 9, it is apparent that merely by initial cranking effort applied to the crank member 60 in either direction, there is caused limited bodily movement of the crank member and its pin 64 relative to the disc portion 52 whereby to compress one spring 70 and shift one side of the crank portion to a substantial degree inwardly of the disc portion, FIGURES 7 and 10. Such shifting while in extended position causes a detent shoulder 72 on the crank member to overlie an adjacent detenting surface 74 of the disc portion 52. Thus, while the cranking effort is maintained, the crank member will not return to retracted position. When releasing the cranking effort, the compressed spring 70 returns the crank member to the neutral position of FIGURE 9 wherein the detent shoulder 72 is free to rotate within the aperture 58 to permit return of the crank member to retracted position.

Having described the invention, what is claimed is:

1. Handle means for a mechanism to be operated, comprising in combination, a crank member, hub means adapted for operative connection with the mechanism to be operated, means mounting said crank member on said hub means for movement relative thereto between a cranking position extended from said hub means and a retracted position, and means responsive to the application of a cranking force to said crank member in the extended position thereof for detenting said crank member in said extended position against movement from said extended position to said retracted position thereof.

2. Handle means as recited in claim 1 and further including means operative in response to the removal of said crank force from said crank member to release said detenting means for movement of said crank member to the retracted position thereof.

3. Handle means for a mechanism to be operated, comprising in combination, a crank member, hub means adapted for operative connection with the mechanism to be operated, means mounting said crank member on said hub means for movement relative thereto between an inoperative position retracted to said hub means and an operative cranking position extending therefrom, said mounting means permitting limited bodily movement of said crank member relative to said hub means upon the application of a cranking force to said crank member while the latter is in the cranking position thereof, and detenting means responsive to the application of a cranking force to said crank member in the cranking position thereof for detenting said crank member against movement from said extended position to said retracted position thereof, said detenting means including detent shoulders on said crank member and said hub means engageable upon said limited bodily movement of said cranking member relative to said hub means under said cranking force.

4. Handle means as recited in claim 3 wherein said hub means includes a first portion securable to the mechanism to be operated and a second crank mounting portion arranged for limited movement relative to said first portion, said crank member being mounted on said second portion, wherein said detenting means detent shoulders are located on said crank member and on said first portion are engageable upon movement of said crank member and said second portion relative to said first portion from a nondetenting position under the application of a cranking force to said crank member, and further including means yieldably maintaining said crank member and said second portion in said nondetenting position relative to said first portion.

5. Handle means as recited in claim 3 wherein said hub means includes a hub member mounting said crank member, wherein said mounting means permitting bodily movement includes retention stud means on one of said members loosely received in mounting recess means in the other of said members for movement therein under cranking force applied to said crank member, and further including means yieldably maintaining said stud means in a neutral relation within said recess means wherein said detenting means is out of engagement.

References Cited

UNITED STATES PATENTS

| | | | |
|---|---|---|---|
| 2,108,554 | 2/1938 | Berg | 49—348 |
| 2,165,060 | 7/1939 | Krug | 74—547 |
| 3,159,392 | 12/1964 | Pollak | 49—351 |
| 2,592,413 | 4/1952 | Garfield | 74—557 |

FRED C. MATTERN, Jr., *Primary Examiner.*

W. S. RATLIFF, *Assistant Examiner.*